United States Patent
Calkins et al.

(10) Patent No.: US 9,885,345 B2
(45) Date of Patent: Feb. 6, 2018

(54) SCALABLE MULTI-ELEMENT SHAPE MEMORY ALLOY ROTARY MOTOR

(71) Applicant: The Boeing Company, Chicago, IL (US)

(72) Inventors: Frederick T. Calkins, Renton, WA (US); James H. Mabe, Seattle, WA (US); Jonathan K. Brown, Renton, WA (US)

(73) Assignee: The Boeing Company, Chicago, IL (US)

( * ) Notice: Subject to any disclaimer, the term of this patent is extended or adjusted under 35 U.S.C. 154(b) by 552 days.

(21) Appl. No.: 14/566,376

(22) Filed: Dec. 10, 2014

(65) Prior Publication Data

US 2016/0169213 A1 Jun. 16, 2016

(51) Int. Cl.
*F03G 7/06* (2006.01)

(52) U.S. Cl.
CPC .................... *F03G 7/065* (2013.01)

(58) Field of Classification Search
CPC .............. F02G 1/043; F03G 7/065
See application file for complete search history.

(56) References Cited

U.S. PATENT DOCUMENTS

| | | | |
|---|---|---|---|
| 4,086,769 A | 5/1978 | Smith | |
| 4,979,672 A | 12/1990 | Abujudom, II et al. | |
| 5,127,228 A * | 7/1992 | Swenson | F03G 7/065 60/527 |
| 5,279,123 A | 1/1994 | Wechsler | |
| 5,624,380 A * | 4/1997 | Takayama | A61B 1/0058 600/141 |
| 6,065,934 A * | 5/2000 | Jacot | F03G 7/065 244/99.8 |
| 6,453,669 B2 * | 9/2002 | Kennedy | B64C 27/001 60/527 |
| 6,499,952 B1 * | 12/2002 | Jacot | F03G 7/065 416/155 |
| 6,834,835 B1 * | 12/2004 | Knowles | B64C 3/54 244/198 |
| 7,037,076 B2 * | 5/2006 | Jacot | F03G 7/065 416/155 |
| 7,688,168 B2 * | 3/2010 | Taya | F04B 9/06 310/26 |
| 7,753,316 B2 | 7/2010 | Larssen et al. | |
| 7,878,459 B2 | 2/2011 | Mabe et al. | |
| 7,918,789 B2 * | 4/2011 | Abadie | A61B 1/0058 348/76 |
| 2007/0236314 A1 * | 10/2007 | Taya | F04B 9/06 335/220 |

FOREIGN PATENT DOCUMENTS

| | | |
|---|---|---|
| EP | 0045250 A1 | 2/1982 |
| EP | 1164287 A2 | 12/2001 |
| JP | 2009180210 A | 8/2009 |
| WO | 9961792 A1 | 12/1999 |
| WO | 0161190 A1 | 8/2001 |

* cited by examiner

*Primary Examiner* — Mark Laurenzi
*Assistant Examiner* — Shafiq Mian
(74) *Attorney, Agent, or Firm* — Felix L. Fischer (57) ABSTRACT

A scalable multi-element shape memory alloy (SMA) rotary motor employs a plurality of SMA tubes. A ratcheting gear transmission couples the plurality of SMA tubes in parallel to a common output. A controller provides power to a plurality of heaters associated with each of the plurality of SMA tubes, sequentially heating selected heaters to provide continuous rotational motion of the common output.

20 Claims, 10 Drawing Sheets

SCALABLE MULTI-ELEMENT SHAPE MEMORY ALLOY ROTARY MOTOR

BACKGROUND INFORMATION

Field

Embodiments of the disclosure relate generally to rotary actuators and more particularly to multiple shape memory alloy (SMA) tubes providing sequential or parallel rotation to an output shaft with ratchet supports for recovery.

Background

Rotary actuators are employed for numerous functions in various mechanical systems including aircraft. Many such actuators are powered by electrical motors which are larger than may be desirable for optimally locating the actuator, particularly in hinge line applications. Mechanical drive trains are therefore required which may add weight and complexity. Scaling of output torque of the rotary actuator typically requires multiple gear sets with a selectable transmission further increasing both the weight and complexity of the actuation system.

Shape memory alloy (SMA) actuators have been employed for hinge line actuation. However, such actuators tend to have limited torque generation. SMA tube actuator output scales with tube radius to the third power and scales with length. Radii of the tubes can be increased to meet torque requirement but larger tubes which can produce desired high torque values currently exceed fabrication capability.

It is therefore desirable to provide a rotary actuator which avoids requirements for extended mechanical drive trains and allows scaling of torque output without the added complexity of multiple gear sets or selectable transmissions.

SUMMARY

Exemplary embodiments provide a scalable multi-element shape memory alloy (SMA) rotary motor employing a plurality of SMA tubes. A ratcheting gear transmission couples the plurality of SMA tubes in parallel to a common output. A controller provides power to a plurality of heaters associated with each of the plurality of SMA tubes, sequentially heating selected heaters to provide continuous rotational motion of the common output and simultaneously providing power to selected multiple heaters to multiply torque at the common output.

The embodiments disclosed provide a method for rotary actuation by training a plurality SMA tubes with a twist direction. Each of the plurality of SMA tubes is constrained at a first end with a ratchet and engaged at a second end for rotational output of a shaft. Sequentially heating the plurality of tubes provides continuous rotation of the output shaft. Simultaneously heating multiple tubes in the plurality of tubes provides multiplied torque at the output shaft.

BRIEF DESCRIPTION OF THE DRAWINGS

The features, functions, and advantages that have been discussed can be achieved independently in various embodiments of the present disclosure or may be combined in yet other embodiments, further details of which can be seen with reference to the following description and drawings.

DETAILED DESCRIPTION

The embodiments and methods described herein provide rotary actuators employing shape memory alloy (SMA) tubes, which provide rotary motion when thermally activated, combined in series and parallel to provide a scaleable rotary motor. This architecture enables increased twist, increased torque, and continuous rotary motion. The SMA tubes are connected in parallel to a common output through gearing or other means. The SMA tubes may be activated simultaneously so the torque output of each tube is added together to multiply the output torque. The SMA tubes can be activated sequentially which adds the twist of the two tubes to provide continuous rotary motion with repetitive actuation.

Figure 1A:
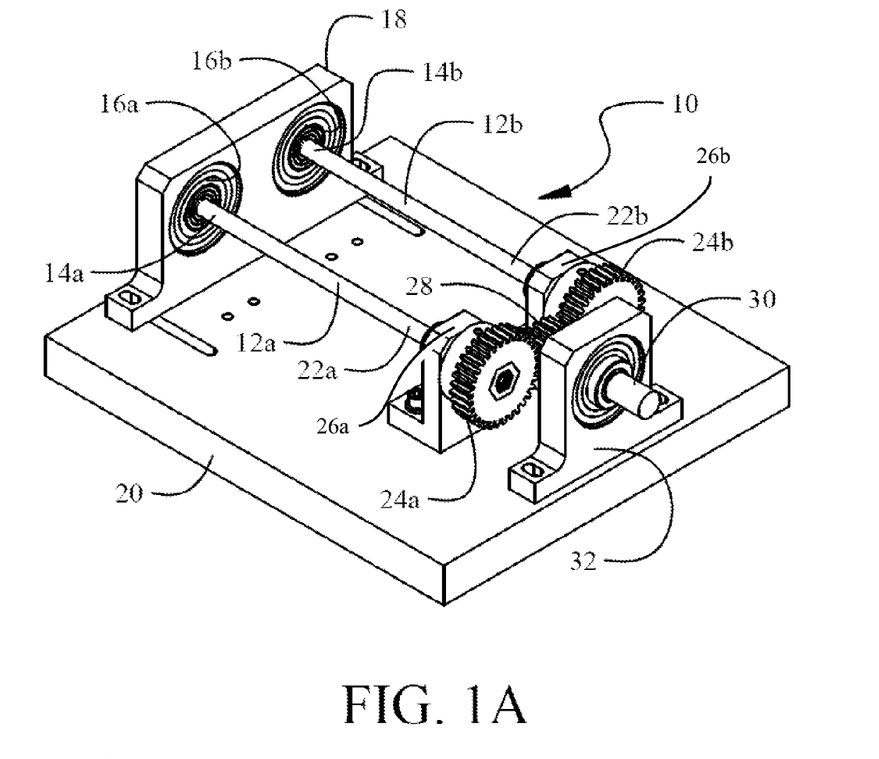
FIG. 1A is an isometric view of an exemplary arrangement of a first embodiment employing two shape memory alloy (SMA) actuator tubes.

Referring to the drawings, FIG. 1A shows a first embodiment or a scalable multi-element SMA rotary motor 10 employing two SMA tubes 12a, 12b each constrained at a first end 14a, 14b by a ratchet 16a, 16b, the function of which will be described in greater detail subsequently. Ratchets 16a and 16b are constrained by a support 18 mounted to a plate 20. A cover (not shown) may be employed to enclose the motor 10 as a self-contained unit as will be described subsequently. While shown as a single support mounting both ratchets, in alternative embodiments, a separate support may be employed for each ratchet or the ratchets may be integrally supported in the cover. A second end 22a, 22b of each SMA tube 12a, 12b is connected to a sprag gear 24a, 24b supported by a bearing block 26a, 26b. As with the ratchet support 18, the bearing blocks may be a single supporting element in alternative configurations. The sprag gears 24a and 24b drive an output gear 28 attached to a rotary output shaft 30 supported by a bearing block 32. As will be described in greater detail subsequently, the ratchets and sprag gears provide a ratcheting transmission coupling the multiple tubes to commonly drive the drive gear and output shaft. While sprag gears are employed in the exemplary embodiments described herein to avoid backlash, plain gears may be employed for attachment of the second end of the SMA tubes to the output gear 28. Sprag gears or plain gears for such attachment shall generally be referred to herein as "coupling gears". Use of plain gears as the coupling gears requires maintaining power on at least one SMA tube to maintain position of the output gear.

Figure 1B:
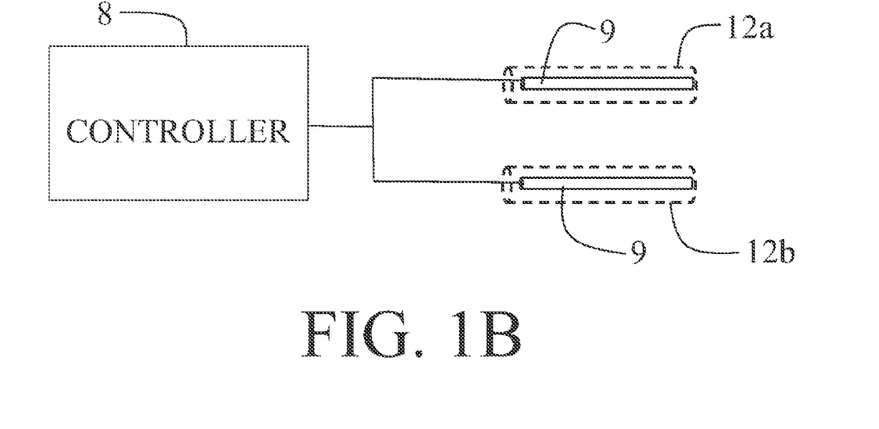
FIG. 1B is a block diagram of the controller and heaters for operation of the SMA tubes.

FIG. 1B shows in block diagram form a controller 8 and heating elements 9 for heating of the tubes 12a and 12b. The heating elements may be rod heaters inserted into central bores in the tubes or may be inductive heating elements as will be described subsequently.

Figure 2A:
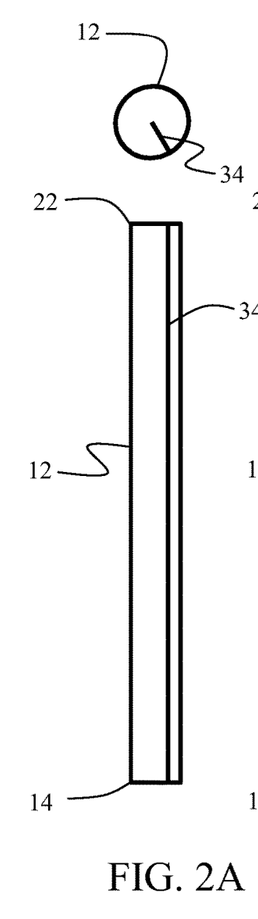
FIGS. 2A-2C demonstrate the training sequence of SMA tubes employed in the disclosed embodiments.
Figure 2B:
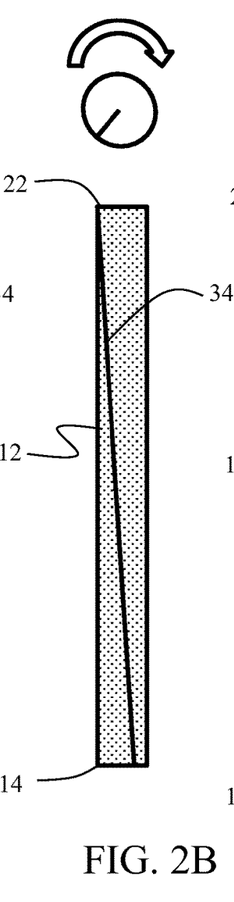
Figure 2C:
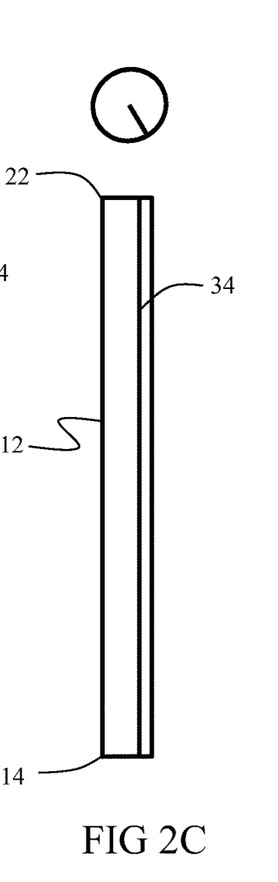

As shown in FIGS. 2A-2C for one SMA tube 12, the tubes can be "trained" by being repeatedly heat cycled at a fixed load, which will allow the tubes to be used as a stable actuator. SMA torque tube 12 has limited rotation travel. For example, at rest in an initial state, tube 12 has a zero twist as represented by "twist line" 34 in FIG. 2A. First end 14 is constrained. Upon heating of the tube 12, the tube rotates 120 degrees under an example 15KSI load at second end 22 as shown by the twist line in FIG. 2B. Upon cooling of the tube 12, the second end 22 will rotate back 120 degrees to the zero point as shown in FIG. 2C.

Figures 3A, 3B:
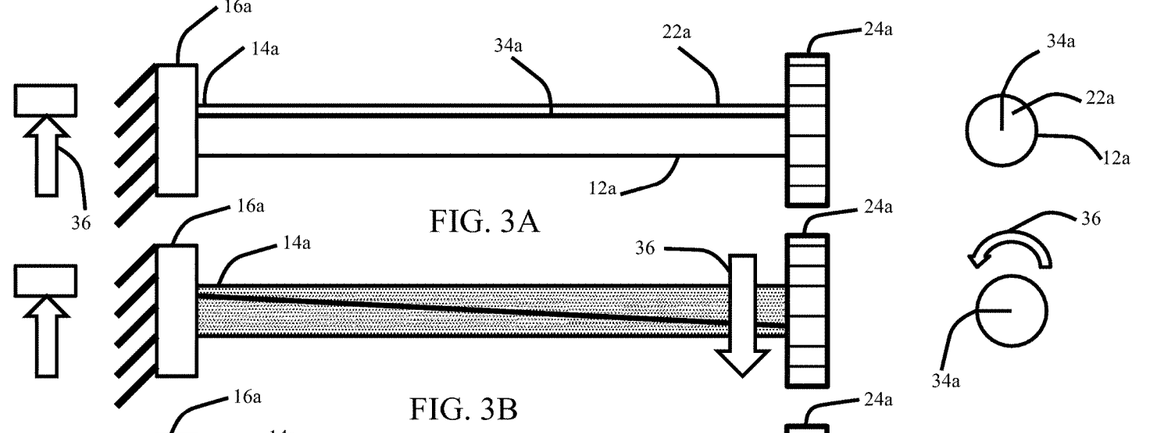
FIGS. 3A-3D demonstrate the operating sequence of a SMA tube and associated ratchet and sprag gear employed by the embodiments.
Figures 3C, 3D:
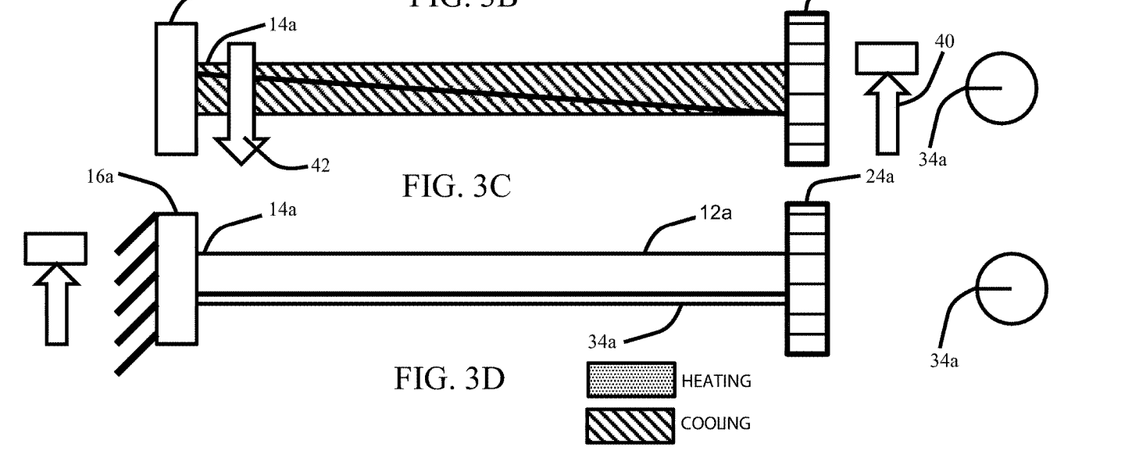

Operation of each of the tubes 12a and 12b of the motor shown in FIG. 1 is represented in FIGS. 3A-3D. Using tube 12a as an example, with the tube at a base temperature as shown in FIG. 3A, first end 14a is constrained by ratchet 16a as represented by blocked arrow 36. Upon heating of the tube 12a as shown in FIG. 3B, the tube twists through second end 22a driving sprag gear 24a in a first rotational direction represented by arrows 38. A rotation of second end 22 of 90° represented by twist line 34a is shown as an example. Ratchet 16a maintains the constraint on first end 14a resulting in the twist or rotation being induced at the second end 22a. Cooling of tube 12a as represented in FIG. 3C results in sprag gear 24a constraining second end 22a as represented by blocked arrow 40 while first end 14a rotates opposite to the constraining direction of ratchet 16a as represented by arrow 42. Upon completion of the cooling of tube 12a, first end 14a has assumed a new zero position as represented by twist line 34a and is again constrained by the ratchet 16a.

Figure 4:
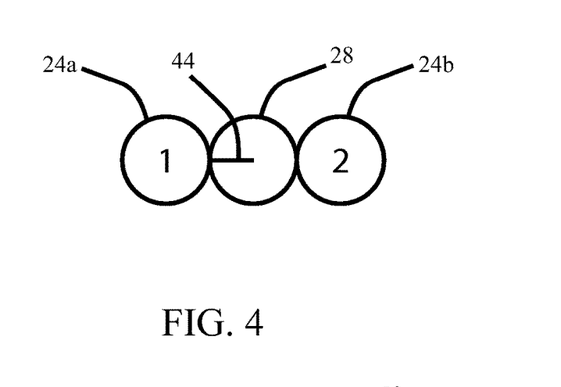
FIG. 4 shows an operational depiction the two actuator tubes of the first embodiment of FIG. 1.
Figure 5:
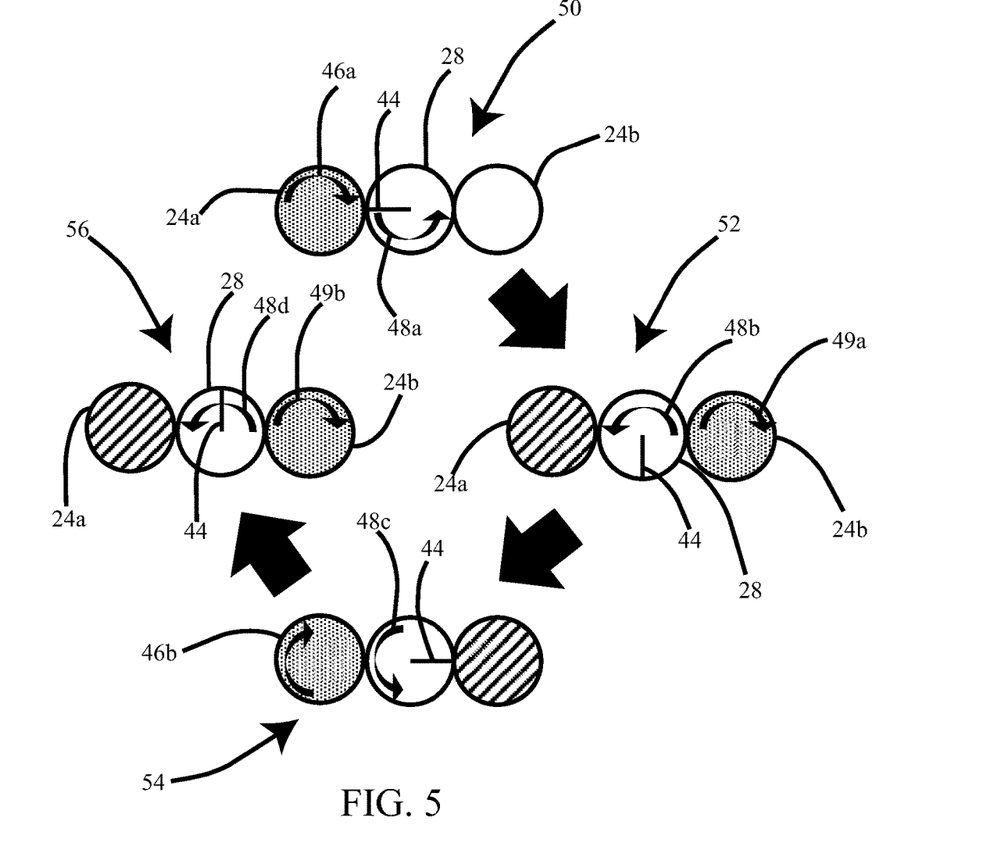
FIG. 5 shows a sequence of operation by the two actuator tubes to provide constant rotary motion.

Operation of the paired tubes 12a and 12b of the motor 10 is represented in FIGS. 4 and 5. As seen in FIG. 4, in an initial state at the base temperature, sprag gears 24a and 24b engage drive gear 28 at a first rotational position represented by index 44. As shown in FIG. 5 with reference to elements as shown in FIG. 1, in a first rotation sequence 50, tube 12a is heated by the controller activating the associated heater resulting in rotation of sprag gear 24a as represented by arrow 46a (the first end 14a of tube 12a being constrained by ratchet 16a) which rotates drive gear 28 as represented by arrow 48a. Tube 12b remains at the base temperature and has a rigid body rotation with sprag gear 24b which freely rotates with drive gear 28. At the completion of the first rotation sequence the controller removes current from the associated heater and tube 12a is allowed to begin cooling. Tube 12b is heated by the controller applying current to the heater associated with tube 12b as shown in second rotation sequence 52 (the first end 14b of tube 12b constrained by ratchet 16b). Sprag gear 24b driven by tube 12b rotates as represented by arrow 49a which continues the rotation of drive gear 28 as represented by arrow 48b. Tube 12a, cooling with first end 14a freely rotating in ratchet 16a and constrained by sprag gear 24a which rotates with drive gear 28, returns to the base state. The sequence of continuous rotation is propagated as shown in third rotation sequence 54 where tube 12a is again heated resulting in rotation of sprag gear 24a as represented by arrow 46b (the first end 14a of tube 12a being constrained by ratchet 16a) which rotates drive gear 28 as represented by arrow 48a. Tube 12b is cooling with first end 14b freely rotating in ratchet 16b and constrained by sprag gear 24b which rotates with drive gear 28, returning to the base state. At the completion of the third rotation sequence, tube 12a is again allowed to begin cooling and tube 12b is heated as shown in fourth rotation sequence 56 (the first end 14b of tube 12b constrained by ratchet 16b). Sprag gear 24b driven by tube 12b rotates as represented by arrow 49b which continues the rotation of drive gear 28 as represented by arrow 48d. Tube 12b, cooling with first end 14b freely rotating in ratchet 16ba and constrained by sprag gear 24a which rotates with drive gear 28, returns to the base state. Rotation of the drive gear 28 can be seen by the rotation of index 44 and the repetition of the sequences described with respect to FIG. 5 allows continuous rotary motion of the drive gear.

Simultaneous heating of tubes 12a and 12b results in both sprag gears 24a and 24b simultaneously driving drive gear 28 resulting in a doubling of the torque provided by drive gear 28 to the output shaft 30.

Figure 6:
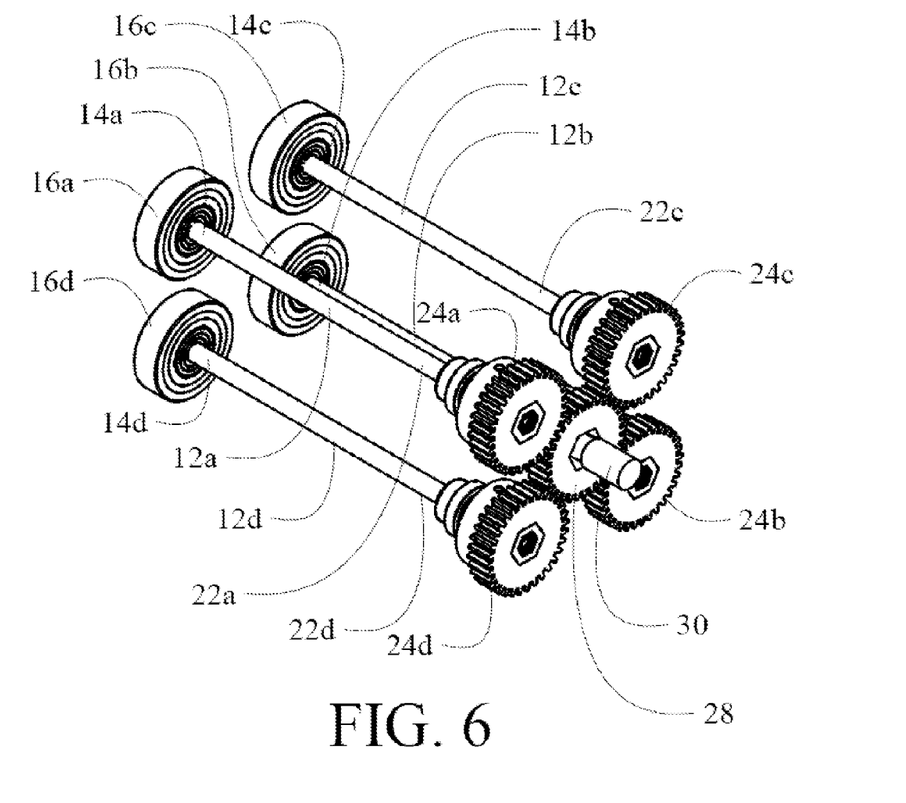
FIG. 6 is an isometric view of an exemplary arrangement of a second embodiment employing four SMA actuator tubes.

Additional torque and continuous drive flexibility can be achieved by providing additional SMA tubes in parallel for the multi-element SMA rotary motor. A second embodiment for a motor 60 is shown in FIG. 6. Four SMA tubes 12a, 12b, 12c and 12d each constrained at a first end 14a, 14b, 14c and 14d by a ratchet 16a, 16b, 16c and 16d are employed. As in the prior embodiment, ratchets 16a, 16b, 16c and 16d are constrained by a support (not shown for clarity). A cover (not shown) may be employed to enclose the motor 60 as a self-contained unit. A second end 22a, 22b, 22c and 22d of each SMA tube 12a, 12b, 12c and 12d is connected to a sprag gear 24a, 24b, 24c and 24d. Supports for the sprag gears are not shown for clarity of the operating components. The sprag gears 24a, 24b, 24c and 24d drive the output gear 28 attached to rotary output shaft 30.

Figure 7:
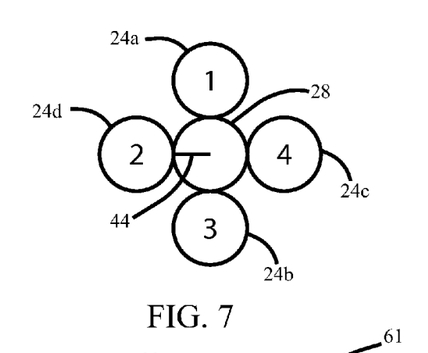
FIG. 7 shows an operational depiction the four actuator tubes of the second embodiment of FIG. 6.
Figure 8:
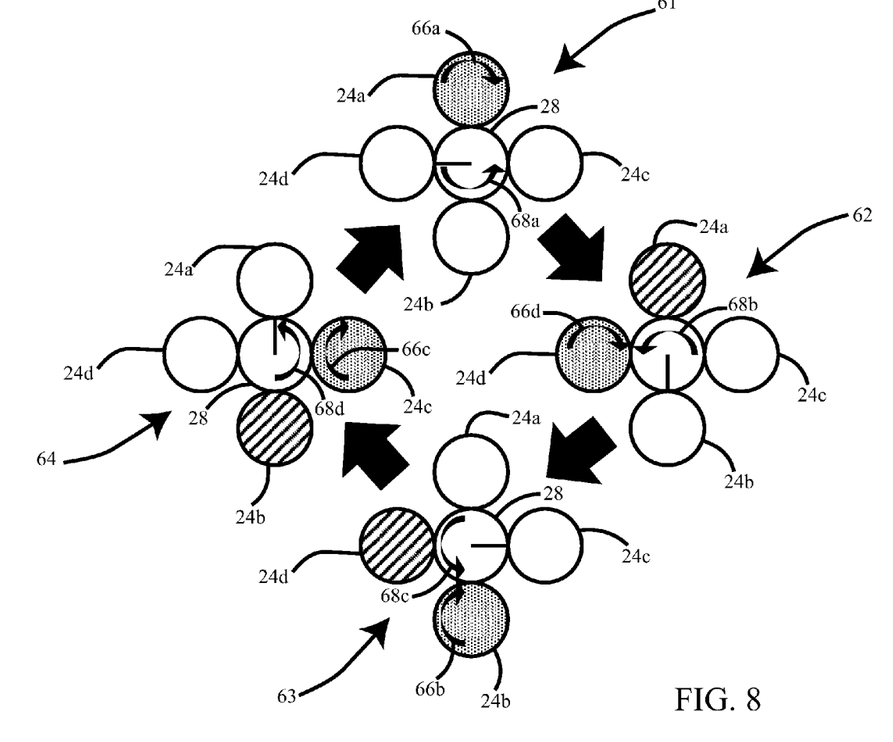
FIG. 8 shows a sequence of operation by the four actuator tubes to provide constant rotary motion.

Operation of the tubes 12a, 12b, 12c and 12d of the motor 60 is represented in FIGS. 7 and 8. As seen in FIG. 7 with reference to elements as shown in FIG. 6, in an initial state at the base temperature, sprag gears 24a, 24b, 24c and 24d engage drive gear 28 at a first rotational position represented by index 44. Continuous rotation of the drive gear 28 is achieved by sequential heating of the tubes in the motor. Any desired sequence may be employed but an example is shown in FIG. 8. In a first rotation sequence 61, tube 12a is heated resulting in rotation of sprag gear 24a as represented by arrow 66a (the first end 14a of tube 12a being constrained by ratchet 16a) which rotates drive gear 28 as represented by arrow 68a. Tubes 12b, 12c and 12d remain at the base temperature and have a rigid body rotation with sprag gears 24b, 24c and 24d which freely rotate with drive gear 28. At the completion of the first rotation sequence, tube 12a is allowed to begin cooling and tube 12d is heated as shown in second rotation sequence 62 (the first end 14d of tube 12d constrained by ratchet 16d). Sprag gear 24d driven by tube 12d rotates as represented by arrow 66d which continues the rotation of drive gear 28 as represented by arrow 68b. Tubes 12b and 12c remain at the base state and operate in rigid body rotation with sprag gears 24b and 24c. Tube 12a, cooling with first end 14a freely rotating in ratchet 16a and constrained by sprag gear 24a which rotates with drive gear 28, returns to the base state. The sequence of continuous rotation is propagated as shown in third rotation sequence 63 where tube 12b is now heated resulting in rotation of sprag gear 24b as represented by arrow 66b (the first end 14b of tube 12b being constrained by ratchet 16b) which rotates drive gear 28 as represented by arrow 68c. Tube 12d is cooling with first end 14d freely rotating in ratchet 16d and constrained by sprag gear 24d which rotates with drive gear 28, returning to the base state. Tubes 12a has now returned to the base state and tube 12c remains at the base state with both tubes operating in rigid body rotation with sprag gears 24a and 24c At the completion of the third rotation sequence, tube 12b is allowed to begin cooling and tube 12c is heated as shown in fourth rotation sequence 64 (the first end 14c of tube 12c constrained by ratchet 16c). Sprag gear 24c driven by tube 12c rotates as represented by arrow 66c which continues the rotation of drive gear 28 as represented by arrow 48d. Tube 12b, cooling with first end 14b freely rotating in ratchet 16b and constrained by sprag gear 24b which rotates with drive gear 28, returns to the base state. Tube 12d has now returned to the base state and with tube 12a in the base state both tubes rotate with sprag gears 24d and 24a in a rigid body rotation with drive gear 28. Rotation of the drive gear 28 through the various rotation sequences can be seen by the rotation of index 44 and the repetition of the sequences described with respect to FIG. 5 allows continuous rotary motion of the drive gear. While four tubes are shown, any desired number of tubes may be employed.

Figure 9:
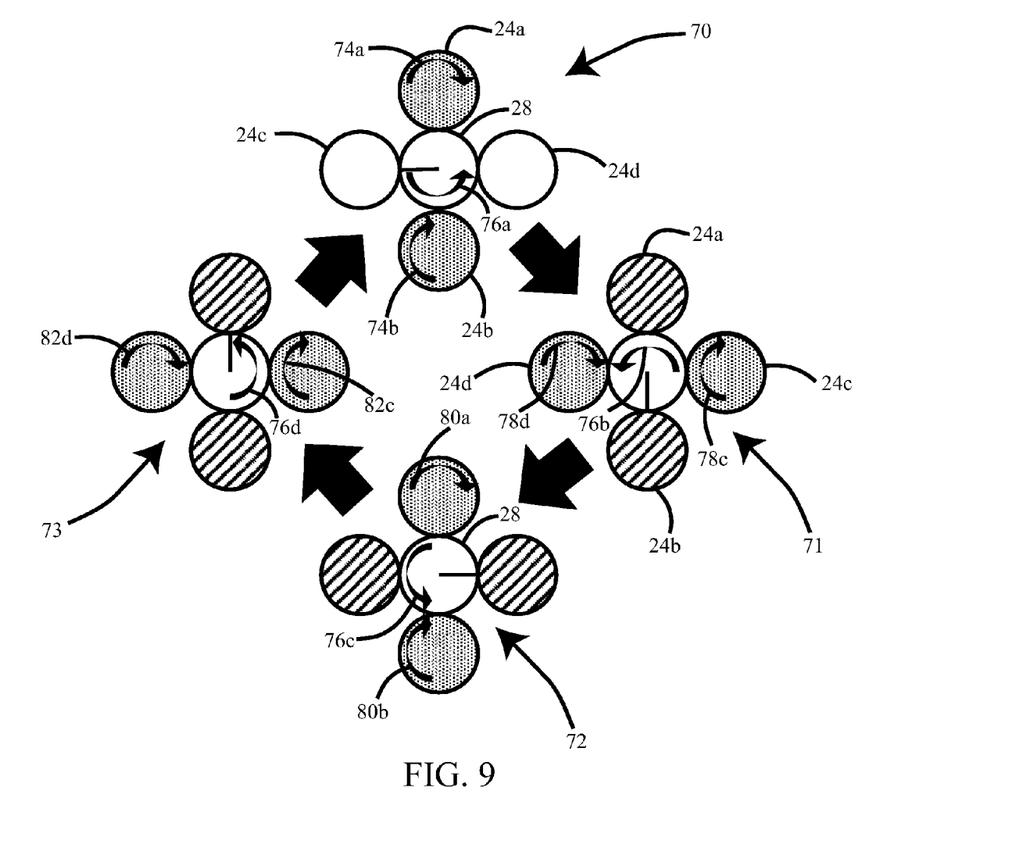
FIG. 9 shows a sequence of operation by the four actuator tubes to provide constant rotary motion with double the torque.

Torque on the output shaft 30 through drive gear 28 may be doubled with motor 60 by operating the SMA tubes in pairs. As shown in FIG. 9 with reference to elements as shown in FIG. 6, in a first rotation sequence 70, tubes 12a and 12b are simultaneously heated resulting in rotation of sprag gears 24a and 24b as represented by arrows 74a and 74b (the first ends 14a, 14b of tubes 12a, 12b being constrained by ratchets 16a, 16b) which rotates drive gear 28 as represented by arrow 76a. Tubes 12c and 12d remain at the base temperature and have a rigid body rotation with sprag gears 24c and 24d which freely rotate with drive gear 28. At the completion of the first rotation sequence, tubes 12a and 12b are allowed to begin cooling and tubes 12c and 12d are simultaneously heated as shown in second rotation sequence 71 (the first ends 14c and 14d of tube 12c and 12d constrained by ratchets 16c and 16d). Sprag gears 24c and 24d driven by tubes 12c and 12d rotate as represented by arrows 78c and 78d which continues the rotation of drive gear 28 as represented by arrow 76b. Tubes 12a and 12b, cooling with first ends 14a and 14b freely rotating in ratchets 16a and 16b and constrained by sprag gears 24a and 24b which rotate with drive gear 28, return to the base state. The sequence of continuous rotation is propagated as shown in third rotation sequence 72 where tubes 12a and 12b are again heated resulting in rotation of sprag gears 24a and 24b as represented by arrows 80a and 80b (the first ends 14a 14b of tubes 12a 12b being constrained by ratchets 16a and 14b) which rotates drive gear 28 as represented by arrow 76c. Tubes 12c and 12d are cooling with first ends 14c, 14d freely rotating in ratchets 16c, 16d and constrained by sprag gears 24c, 24d which rotate with drive gear 28, returning to the base state. At the completion of the third rotation sequence, tubes 12a and 12b are again allowed to begin cooling and tubes 12c and 12d are simultaneously heated as shown in fourth rotation sequence 73 (the first ends 14c and 14d of tubes 12c and 12d constrained by ratchets 16c and 16d). Sprag gears 24c and 24d driven by tubes 12c and 12d rotate as represented by arrows 82c and 82d which continues the rotation of drive gear 28 as represented by arrow 76d. Tubes 12a and 12b, cooling with first ends 14a and 14b freely rotating in ratchets 16a and 16b and constrained by sprag gears 24a and 24b which rotate with drive gear 28, return to the base state. Rotation of the drive gear 28 can be seen by the rotation of index 44 and the repetition of the sequences described with respect to FIG. 9 allows continuous rotary motion of the drive gear at twice the torque of FIG. 8.

Bi-directional rotation of the drive shaft 30 can also be achieved by opposite twist orientation of pairs of the SMA tubes with associated oppositely oriented ratchet and sprag gear sets which alternately drive the common output of the drive gear in a first rotating direction and a second rotating direction. Such bi-directional rotation may be employed, for example, for actuating a control surface when rotating in the first direction and retracting the control surface when rotating in the second direction. As represented in FIG. 9, again with reference to elements as defined in FIG. 6, tubes 12a and 12b with associated sprag gears 24a and 24b may be trained to produce a clockwise engaged rotation of the sprag gears while tubes 12c and 12d with associate sprag gears 24c and 24d are trained to produce a counter clockwise engaged rotation of the sprag gears. Continuous rotation in either direction can then be achieved by operating one tube pair as described previously with respect to FIGS. 4 and 5.

Figure 10:
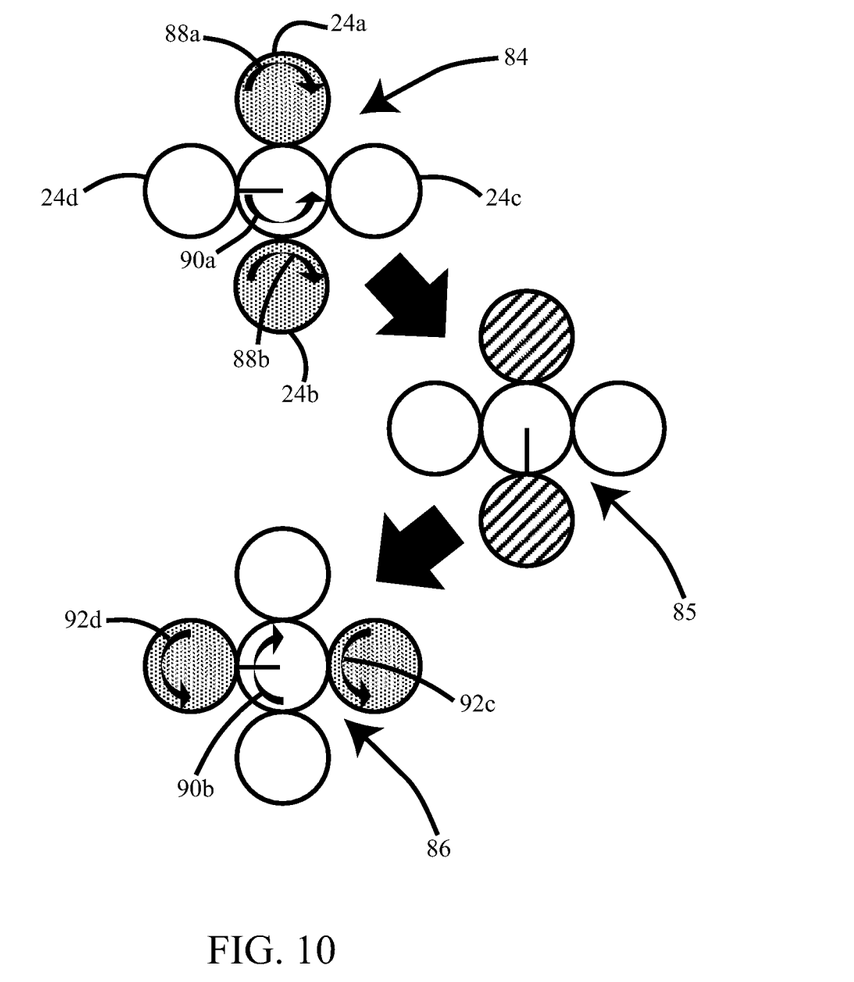
FIG. 10 shows a sequence of operation by two pairs of actuator tubes with opposite twist for reversible rotary motion.

Operation with double the torque for a limited twist range can be accomplished as shown in FIG. 10. In a first rotation sequence 84, tubes 12a and 12b are simultaneously heated resulting in rotation of sprag gears 24a and 24b clockwise as represented by arrows 88a and 88b (the first ends 14a, 14b of tubes 12a, 12b being constrained by ratchets 16a, 16b) which rotates drive gear 28 counterclockwise as represented by arrow 90a. Tubes 12c and 12d remain at the base temperature and have a rigid body rotation with sprag gears 24c and 24d which freely rotate with drive gear 28. From a new base state as shown in the second position 85, the index 44 having been rotated 90 degrees by the operation of sequence 84, an opposite rotation sequence 86 may be obtained. Tubes 12c and 12d are simultaneously heated resulting in rotation of sprag gears 24c and 24d counterclockwise as represented by arrows 92c and 92d (the first ends 14c, 14d of tubes 12c, 12d being constrained by ratchets 16c, 16c) which rotates drive gear 28 clockwise as represented by arrow 90b returning index 44 to its original position. Tubes 12a and 12b remain at the base temperature and have a rigid body rotation with sprag gears 24a and 24b which freely rotate with drive gear 28. Individual tubes may also be used for bi-directional rotation by use of reversible ratchets for ratchets 16a, 16b, 16c and 16d and either plain gears or reversible sprag gears for the coupling gears.

Figure 11:
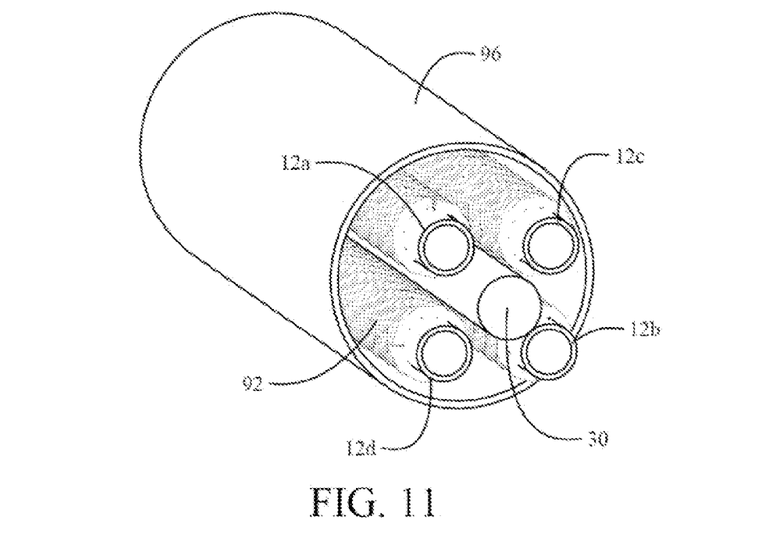
FIG. 11 is a pictorial view of a four tube embodiment configured as a Line Replaceable Unit (LRU) for actuator installations.

The exemplary four SMA tube embodiment may be packaged as a line replaceable unit (LRU) for use in rotary actuator applications. As shown in FIG. 11, heating of the tubes may be accomplished by induction heating using solenoid coils 92 concentrically receiving the tubes 12a, 12b, 12c and 12d. Introducing high current at high frequency into the coils provides an oscillating magnetic field inside the tubes. The magnetic field created by the coil induces eddy currents in the SMA tube which heats the tube. Cooling of the tubes may be accomplished with natural conduction and convection or forced convection may be employed by introducing cooling air through the central bores of the tubes with cooling fans or similar means. Output shaft 30 is shown extending through and parallel to the tubes for operational attachment extending from a case as described subsequently at either end or both ends of the actuator. The sprag gears, drive gear and associated supporting structure are not shown for clarity.

Figure 12:
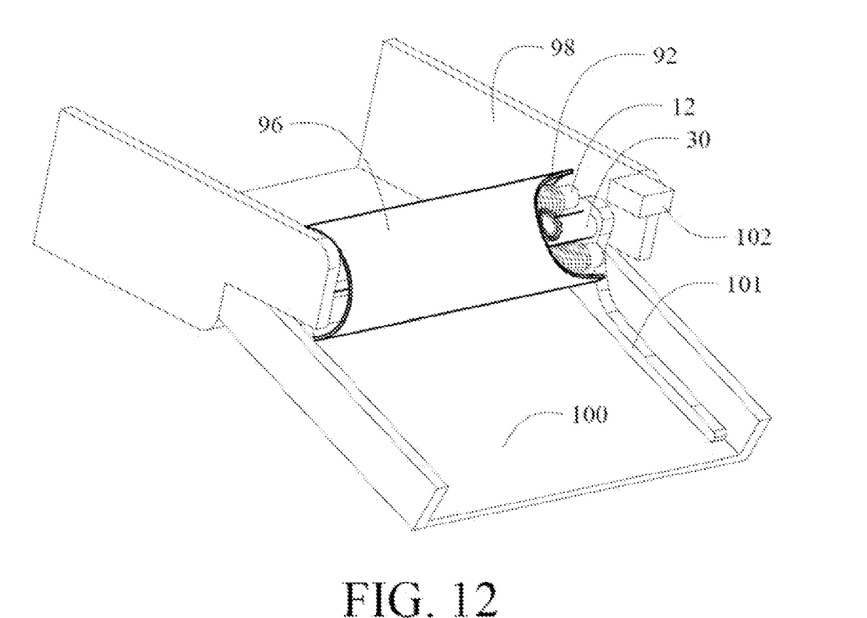
FIG. 12 is a pictorial cutaway view of the embodiment of FIG. 11 installed for actuation of an auxiliary power unit (APU) access door in an aircraft application; and, FIG. 13 is a flow chart of a method for rotary actuation employing embodiments as disclosed herein.

An LRU for use in an exemplary application such as an auxiliary power unit (APU) inlet door is shown in FIG. 12. The LRU case 96 containing the SMA tubes 12 with induction coils 92, and ratchets, sprag gears and drive gear (as previously described but not shown for clarity), driving output shaft 30, is mountable between structural supports 98 for the APU inlet door 100. The output shaft 30 extends from both ends of the case 96 to engage the inlet door support brackets 101 for actuating and retracting rotation. A controller 102 providing controlled high frequency alternating current to the induction coils for selective heating of the SMA tubes, which may provide bi-directional operation as described with respect to FIG. 10, may be integrated into the LRU case 96 or separately mounted.

Figure 13:
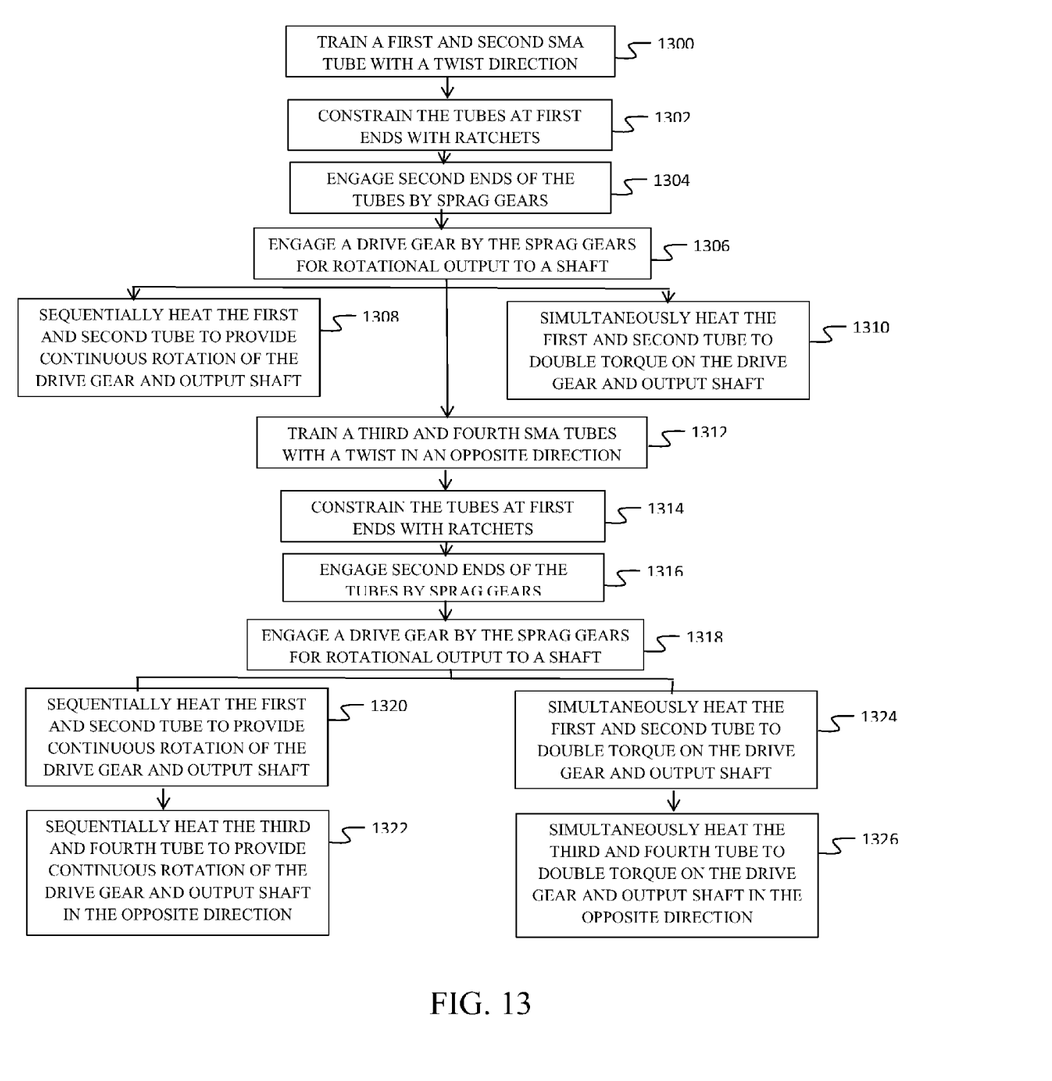

The embodiments disclosed herein allow a method of rotary actuation as depicted in FIG. 13. At least two SMA tubes are trained with a twist direction, step 1300, and constrained at first ends with ratchets, step 1302. Second ends of the SMA tubes are engaged by sprag gears, step 1304. A drive gear is operably engaged by the sprag gears for rotational output to a shaft, step 1306. Sequential heating of the first and second tube in the tube pair is accomplished to provide continuous rotation of the drive gear and output shaft, step 1308. Simultaneous heating of both tubes in the pair may be employed for doubling torque on the output gear and shaft, step 1310. A second pair of SMA tubes are trained with an opposite twist direction, step 1312, and constrained a first ends with ratchets, step 1314. Second ends of the second pair of SMA tubes are engaged by sprag gears, step 1316, and the sprag gears are attached to the drive gear, step 1318. The sprag gears and ratchets associated with the second tube pair have opposite operational direction to the sprag gears and ratchets associated with the first tube pair. Sequential heating of the first and second tube in the first tube pair is accomplished to provide continuous rotation of the drive gear and output shaft in a first direction, step 1320. Sequential heating of the first and second tube in the second tube pair is accomplished to provide continuous rotation of the drive gear and output shaft in a second direction, step 1322. Simultaneous heating of both tubes in the first pair may be employed for doubling torque on the output gear and shaft in the first direction, step 1324. Simultaneous heating of both tubes in the second pair may be employed for doubling torque on the output gear and shaft in the second direction, step 1326.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A scalable multi-element shape memory alloy (SMA) rotary motor comprising:
    a plurality of SMA tubes each having a twist direction for rotary motion;
    a ratcheting gear transmission coupling the plurality of SMA tubes, each of the plurality of SMA tubes are in parallel to rotate a common output in a rotational direction;
    a controller providing power to a plurality of heaters, one of said plurality of heaters associated with each of the plurality of SMA tubes, said controller sequentially heating selected heaters in the plurality of heaters to provide continuous rotational motion of the common output in the rotational direction.

2. The scalable multi-element SMA rotary motor as defined in claim 1 wherein the controller provides power simultaneously to selected multiple heaters in the plurality of heaters to multiply torque at the common output.

3. The scalable multi-element SMA rotary motor as defined in claim 1 wherein the plurality of SMA tubes have a common twist direction, said plurality of tubes constrained in the twist direction at a first end and further comprising:
    a drive gear operably engaged to a second end of each of said plurality of SMA tubes, said second end freely rotating in said twist direction; and,
    an output shaft connected to the drive gear as the common output.

4. The scalable multi-element SMA rotary motor as defined in claim 3 further comprising a plurality of ratchets, an associated ratchet in the plurality of ratchets engaged to the first end of each of said plurality of SMA tubes, each associated ratchet constraining the first end of said each of said plurality of SMA tubes in an opposite direction to the twist direction and freely rotating in said twist direction.

5. The scalable multi-element SMA rotary motor as defined in claim 3 further comprising an associated sprag gear engaged to the second end of each of said plurality of SMA tubes, said sprag gear engaged to the drive gear and operating in the twist direction.

6. The scalable multi-element SMA rotary motor as defined in claim 1 wherein a first portion of the plurality of SMA tubes is trained with a first twist direction and a second portion of the plurality of SMA tubes is trained with a second twist direction, said controller heating selected heaters associated with the first portion of the plurality of SMA tubes for rotational motion of the common output in an actuating rotational direction and heating selected heaters associated with the second portion of the plurality of SMA tubes for rotational motion of the common output in a retracting rotational direction.

7. The scalable multi-element SMA rotary motor as defined in claim 6 wherein the controller provides power simultaneously to multiple heaters in the first portion of the plurality of heaters to multiply torque at the common output in the actuating direction and provides power simultaneously to multiple heaters in the second portion of the plurality of heaters to multiply torque at the common output in the retracting direction.

8. The scalable multi-element SMA rotary motor as defined in claim 2 wherein the plurality of heaters comprises;
    a plurality of solenoid coils, one coil concentrically receiving each SMA tube of the plurality of SMA tubes, said solenoid coils to create eddy currents in said each of the plurality of the SMA tubes for inductive heating;
    and wherein the controller provides high current and high frequency power to selected solenoid coils in the plurality of solenoid coils as the selected heater.

9. A line replaceable unit (LRU) rotary motor comprising:
    at least two pairs of shape memory alloy (SMA) tubes, each pair of the SMA tubes arranged in parallel and having an associated common twist direction for rotary motion, each pair of the SMA tubes constrained in the associated common twist direction at a first end of each of the SMA tubes by an associated one of a plurality of ratchets constraining the first end in an opposite direction to the twist direction and freely rotating in said twist direction and said each of the SMA tubes engaged at a second end to an associated one of a plurality of sprag gears operating in the associated common twist direction;
    a drive gear engaged to said plurality of sprag gears to rotate in the twist direction;
    an output shaft extending from the drive gear to provide a common output; and a controller providing power to a plurality of heaters, one of said plurality of heaters associated with each of the SMA tubes, said controller sequentially heating selected heaters in the plurality of heaters to provide continuous rotational motion of the common output.

10. The LRU rotary motor as defined in claim 9 wherein the controller provides power simultaneously to selected multiple heaters in the plurality of heaters to multiply torque at the common output.

11. The LRU rotary motor as defined in claim 9 wherein the twist direction of a first of the at least two pairs of the SMA tubes is in a first direction and the twist direction of a second of the at least two pairs of the SMA tubes is in a second direction.

12. The LRU rotary motor as defined in claim 9 wherein the plurality of ratchets and the plurality of sprag gears are supported within a common case, the output shaft extending from at least one end of the case.

13. The LRU rotary motor as defined in claim 9 wherein the plurality of heaters comprises:
 a plurality of solenoid coils, one coil concentrically receiving each SMA tube of the plurality of SMA tubes, said solenoid coils to create eddy currents in the SMA tubes for inductive heating;
 and wherein the controller provides high current and high frequency power to selected solenoid coils in the plurality of solenoid coils as the selected heater.

14. A method for rotary actuation comprising:
 training a plurality SMA tubes with a twist direction;
 constraining each of the plurality of SMA tubes at a first end with a plurality of ratchets;
 engaging second ends of the plurality of SMA tubes for rotational output of a shaft; and,
 sequentially heating the plurality of SMA tubes to provide continuous rotation of the output shaft.

15. The method of claim 14 further comprising:
 simultaneously heating each of the SMA tubes of the plurality of SMA tubes for multiplying torque on the output shaft.

16. The method as defined in claim 15 wherein the step of simultaneously heating comprises:
 simultaneously providing high current and high frequency power to a plurality of coils concentrically receiving the plurality of SMA tubes; and,
 generating eddy currents in the plurality of SMA tubes for heating.

17. The method as defined in claim 14 wherein the step of sequentially heating comprises:
 sequentially providing high current and high frequency power to a plurality of coils concentrically receiving the plurality of SMA tubes; and,
 generating eddy currents in the plurality of SMA tubes for hating.

18. A method for rotary actuation comprising:
 training a first plurality SMA tubes with a twist direction;
 constraining each of the first plurality of SMA tubes at a first end with a plurality of ratchets;
 engaging second ends of the first plurality of SMA tubes for rotational output of a shaft; and,
 sequentially heating the first plurality of SMA tubes to provide continuous rotation of the output shaft;
 training a second plurality of SMA tubes with an opposite twist direction;
 constraining a first end of the second plurality of SMA tubes with a second plurality of ratchets;
 engaging second ends of the second plurality of SMA tubes to the shaft for rotational output, the second plurality of ratchets associated with the second plurality of SMA tubes having opposite operational direction to the plurality of ratchets associated with the first plurality of SMA tubes;
 sequentially heating the first plurality of SMA tubes to provide continuous rotation of the output shaft in a first direction;
 sequentially heating the second plurality of SMA tubes to provide continuous rotation of the output shaft in a second direction.

19. The method as defined in claim 18 further comprising:
 simultaneously heating of multiple SMA tubes in the first plurality of SMA tubes for multiplying torque on the shaft in the first direction.

20. The method as defined in claim 19 further comprising:
 simultaneously heating multiple SMA tubes in the second plurality of SMA tubes for multiplying torque on the shaft in the second direction.

* * * * *